(12) United States Patent
Schum

(10) Patent No.: US 10,821,640 B2
(45) Date of Patent: Nov. 3, 2020

(54) PROCESS FOR THE PRODUCTION OF VIRTUAL THREE-DIMENSIONAL PATTERNS IN MOULDINGS

(71) Applicant: Merck Patent GmbH, Darmstadt (DE)

(72) Inventor: Markus Schum, Reichelsheim (DE)

(73) Assignee: Merck Patent GmbH, Darmstadt (DE)

( * ) Notice: Subject to any disclaimer, the term of this patent is extended or adjusted under 35 U.S.C. 154(b) by 246 days.

(21) Appl. No.: 16/061,826

(22) PCT Filed: Nov. 15, 2016

(86) PCT No.: PCT/EP2016/001904
§ 371 (c)(1),
(2) Date: Jun. 13, 2018

(87) PCT Pub. No.: WO2017/102047
PCT Pub. Date: Jun. 22, 2017

(65) Prior Publication Data
US 2018/0361639 A1    Dec. 20, 2018

(30) Foreign Application Priority Data
Dec. 15, 2015 (EP) .................................. 15200127

(51) Int. Cl.
| | |
|---|---|
| B29C 45/14 | (2006.01) |
| B29C 45/16 | (2006.01) |
| B44F 7/00 | (2006.01) |
| B29L 31/00 | (2006.01) |
| B44C 1/10 | (2006.01) |
| B44C 5/04 | (2006.01) |

(52) U.S. Cl.
CPC .... *B29C 45/14688* (2013.01); *B29C 45/1671* (2013.01); *B44C 1/10* (2013.01); *B44C 5/0453* (2013.01); *B44F 7/00* (2013.01); *B29C 2045/1454* (2013.01); *B29C 2045/1673* (2013.01); *B29K 2995/002* (2013.01); *B29K 2995/0025* (2013.01); *B29K 2995/0026* (2013.01); *B29L 2031/722* (2013.01)

(58) Field of Classification Search
None
See application file for complete search history.

(56) References Cited

U.S. PATENT DOCUMENTS

| | | | |
|---|---|---|---|
| 4,495,125 A | 1/1985 | Hatakeyama | |
| 7,906,054 B2 | 3/2011 | Hirschfelder | |
| 2002/0048667 A1 | 4/2002 | Kauppi | |
| 2003/0122278 A1 | 7/2003 | Kosanvoich | |
| 2004/0139889 A1* | 7/2004 | Zimmermann | ....... C09C 1/0015 106/415 |
| 2006/0292321 A1* | 12/2006 | Chervin | .............. B29C 45/1671 428/34.6 |
| 2013/0203932 A1* | 8/2013 | Fujisawa | ................. C08L 25/06 524/577 |
| 2015/0017404 A1* | 1/2015 | Gayer | ....................... B44C 1/00 428/207 |
| 2015/0367543 A1 | 12/2015 | Schum | |

FOREIGN PATENT DOCUMENTS

| | | |
|---|---|---|
| DE | 102004041833 A1 | 3/2006 |
| EP | 2930066 A1 | 10/2015 |
| EP | 2960039 A1 | 12/2015 |
| JP | 4128041 A | 4/1992 |
| JP | 0092538 A | 4/1993 |
| JP | 07137221 A | 5/1995 |
| JP | 2003103709 A | 4/2003 |
| WO | 2013123960 A1 | 8/2013 |
| WO | 2017102047 A1 | 6/2017 |

OTHER PUBLICATIONS

International Search Report PCT/EP2016/001904 dated Jan. 31, 2018.
Database WPI Week 199307, Derwent World Patents Index; AN 1993-055006, XP002766020.

* cited by examiner

*Primary Examiner* — Peter L Vajda
*Assistant Examiner* — Paul Spiel
(74) *Attorney, Agent, or Firm* — Millen White Zelano and Branigan, PC; John Sopp

(57) ABSTRACT

The present invention relates to a process for the production of virtual three-dimensional patterns in mouldings, in particular to an injection-moulding process for the production of mouldings having a virtual three-dimensional pattern which is formed by flake-form effect pigments, to the mouldings produced by means of this process, and to the use thereof, in particular for decorative purposes.

8 Claims, No Drawings

PROCESS FOR THE PRODUCTION OF VIRTUAL THREE-DIMENSIONAL PATTERNS IN MOULDINGS

The present invention relates to a process for the production of virtual three-dimensional patterns in mouldings, preferably of plastic mouldings, and in particular to an injection-moulding process for the production of mouldings which have on at least one of their surfaces a virtual three-dimensional pattern which is formed by flake-form effect pigments, to a moulding which has a virtual three-dimensional pattern of this type, and to the use thereof.

Decorative three-dimensional patterns on plastic articles are known and have already been in use for some time. They provide the said goods with an exclusive appearance which suggests depth and differs from conventional patternings in an advantageous manner. The mouldings or films are frequently embossed or otherwise structured on at least one of their surfaces in order ultimately to have a three-dimensional pattern. In order to achieve particular optical effects, both mouldings and also films are often assembled in multiple layers and embossed in the layer composite. In addition, they may also be provided with functional and/or decorative coatings, usually in the form of paints, which may optionally also comprise metal-effect pigments and the like in order, for example, to increase the gloss of the three-dimensional structures.

Structuring processes of this type are often associated with high equipment complexity. Three-dimensionally embossed surfaces of polymeric mouldings additionally have the disadvantage that they are susceptible to dirt and can only be protected inadequately against mechanical deformations.

Various processes have therefore already been developed with the aid of which polymeric mouldings, which are generally films, can be provided with three-dimensional patterns in such a way that although these patterns are optically perceptible, they are not haptically perceptible to the observer.

Thus, for example, JP-A-07-137221 and JP-A-05-092538 disclose decorative layer systems which in each case contain embossed or otherwise structured layers, which may also comprise lustre pigments, usually applied via printing inks, between a polymeric substrate and a polymeric top layer. The production of composite materials of this type requires a multiplicity of different working steps and complex lamination or other bonding of different material layers to one another. In addition, only flat, i.e. substantially two-dimensional mouldings, such as, for example, decorative films, can be produced in this way, while mouldings having a pronounced three-dimensional shape cannot be produced.

DE 10 2004 041 833 A1 discloses a process for the production of a decorated injection-moulded article, in which a transfer film which contains a decorative element which is located on a support film provided with a release layer is coated with a plastic injection-moulding composition on the side facing away from the support film in an injection mould, the support film is subsequently detached, and the moulding prefabricated in this way is likewise coated with an injection-moulding composition on the transfer film side in a second injection mould. The resultant polymeric moulding contains in the interior the transfer film's transfer layer containing the decoration. The decoration can be a hologram or diffractive structures, which remain unchanged during the two injection-moulding steps and are visible on both sides in the resultant polymeric moulding.

Although optically attractive polymeric mouldings having patterns which cannot be felt haptically and in which the patterns may have three-dimensional shapes are formed in this process, a process of this type can only be implemented with high equipment complexity and material costs. Thus, multilayered transfer films with pattern interlayers produced in a complex manner firstly have to be prefabricated and subsequently have to be coated successively on both sides by means of two different injection moulds. A process of this type is much too complex for the production of mass-produced articles and therefore cannot be employed economically.

In addition, using the process mentioned above, it is only possible to produce mouldings which consist predominantly of polymeric plastics. The process is not suitable for the production of composite mouldings which, besides the plastic component, also consist of not inconsiderable proportions by weight of other materials, for example of metals.

It would therefore be desirable to have available a simple, fast and comparatively inexpensive process for the production of mouldings which is equally suitable for the production of polymeric mouldings and of composite mouldings which in each case have a two- or three-dimensional outer shape, where the mouldings exhibit, on viewing of their surface, an optically, but not haptically, perceptible pattern with a three-dimensional appearance, which can be carried out with few process steps and with conventional moulds, where the pattern is an attractive, glossy pattern with a three-dimensional appearance in the interior of the moulding, and to mouldings produced in this way.

The object of the present invention therefore consists in providing a process which allows the production of glossy patterns having a three-dimensional appearance with fine line structures inside two- or three-dimensionally shaped mouldings of a very wide variety of compositions in a few working steps by means of moulding processes and apparatuses known per se and facilitates a great variation latitude in shape and material composition of the resultant mouldings.

A further object of the present invention consists in providing two- or three-dimensional mouldings which, on viewing of at least one of their surfaces, exhibit a glossy pattern having a three-dimensional appearance with fine line structures which is located in the interior of the moulding, without having on their surface an equally three-dimensional pattern, where the mouldings may optionally consist to a considerable proportion of material other than plastics.

An additional object of the present invention consists in indicating the use of the mouldings produced in this way.

The object of the present invention is achieved by an injection-moulding process for the production of virtual three-dimensional patterns in mouldings, where an injection mould is provided which has injection mould parts A and B which can be separated from one another and which in each case have an inside surface A' and B' and together form an internal cavity, and where, with the injection mould opened, a preform which has a two- or three-dimensional shape and an outside surface is fixed to the inside surface A' of injection mould part A in such a way that the outside surface of the preform faces the cavity, where this outside surface has, at least on a part-area thereof, bumps and/or pits which together form a three-dimensional pattern, a thermoplastic film which has been pigmented with flake-form effect pigments is introduced into the internal cavity, the injection mould is closed,
a transparent thermoplastic melt is introduced into the internal cavity between the thermoplastic film and the surface B' of injection mould part B, where the thermoplastic film forms a strongly adherent and positive connection to at least that part of the outside surface of the preform that contains the three-dimensional pattern and at the same time to the thermoplastic melt,
and
where the flake-form effect pigments replicate and optically intensify the three-dimensional pattern located on the outside surface of the preform on or in the thermoplastic film,
the injection mould is heated or cooled and subsequently
the resultant moulding, which has an outside surface of transparent thermoplastic and exhibits on at least part of this outside surface a virtual three-dimensional pattern formed by the flake-form effect pigments, is demoulded or removed.

Furthermore, the object of the invention is achieved by a moulding which consists of a preform, an interlayer of a thermoplastic which has been pigmented with flake-form effect pigments, located on the preform, and an outer surface layer of a transparent thermoplastic, where the outer surface layer exhibits, on at least one part-area thereof, an optically perceptible, virtual three-dimensional pattern formed in the interior of the moulding by the flake-form effect pigments, and where the outer surface layer of the moulding itself has no corresponding spatial three-dimensional pattern.

In addition, the object of the invention is also achieved by the use of the moulding described above as decorative and/or labelling element or part of durable consumer goods.

The present invention therefore relates to an injection-moulding process for the production of a two- or three-dimensionally shaped moulding in which a glossy pattern having a three-dimensional appearance is visible on at least part of its outside surface and is not present in the same way in a spatially three-dimensional manner on this part of the surface, i.e. represents a virtual three-dimensional pattern.

The injection-moulding process according to the invention essentially corresponds to a conventional injection-moulding process which uses a separable injection mould whose internal cavity corresponds to the final shape of the moulding to be produced. A plastic melt is introduced into this cavity and subsequently allowed to solidify. The moulding produced is subsequently demoulded from the opened injection mould or removed therefrom.

For the process according to the invention, the conventional injection mould is modified in such a way that it has in one of the injection mould parts (injection mould part A) an insert or another device which is capable of accommodating a preform. This preform can have a two- or three-dimensional shape, where, for the purposes of the present invention, flat structures, such as, for example, films or plates, are to be regarded as two-dimensional, whereas other spatial structures which do not have a flat shape are to be regarded as three-dimensional. Three-dimensional preforms are not restricted in shape, so long as the injection mould is able to accommodate the corresponding preforms and the latter can be fixed to, in or on the inside surface A' of injection mould part A.

The preform here is fixed to the inside surface A' in such a way that its outside surface faces the cavity of the injection mould (in accordance with the invention, outside surface of the preform is taken to mean: one of the two principal surfaces of a film or plate, the convex surface or part-areas thereof in the case of three-dimensional hollow bodies or at least part of the entire outside surface in the case of three-dimensionally shaped bodies having a closed surface).

By contrast, the inside surface of the preform is, for the purposes of the present invention, taken to mean the part of the entire surface of the preform that does not form the outside surface of the preform, i.e. the principal surface of a film plate that does not face the cavity of the injection mould, but instead the inside surface A', or the inside surface of a three-dimensional hollow body or the part of the outside surface of a three-dimensional body having a closed surface that faces the inside surface A' of the injection mould.

Depending on the technical requirements and intended use of the resultant moulding, the inside surface of the preform can be designed freely and can be provided, for example, with snap-fit lugs, ribs or reinforcing struts. It faces the inside surface A' of the injection mould and is fixed thereto.

The preform can be a polymeric preform which consists predominantly of plastic, but may also be a preform which consists to a predominant part of a material other than plastic.

Polymeric preforms may comprise, as polymeric component, various thermoplastics, for example polystyrene (PS), polypropylene (PP), polycarbonate (PC), polymethyl methacrylate (PMMA), styrene-acrylonitrile (SAN), various thermoplastic elastomers (TPEs) or acrylonitrile-butadiene-styrene (ABS), to mention just a few. Other than those mentioned above, it is also possible to employ further copolymers which contain the above-mentioned polymers. In addition, polymeric preforms may also comprise, as polymer constituent, various thermosetting plastics, such as, for example, melamine/phenolic resins (MP/MF), melamine/polyester resins (MPV), unsaturated polyester resins (UP) of phenolic resins (PF). Various rubbers or silicones are also possible as polymer constituent of the polymeric preforms.

Further ingredients are optionally additives and assistants which are able to influence the mechanical strength, the functional properties or the optical properties of the preforms, for example reinforcing glass or carbon fibres, carbon blacks, conductive additives, particulate fillers and/or inorganic or organic colourants, as well as further assistants and additives.

The polymeric preforms are transparent, semitransparent or opaque and can be in both colourless and coloured form, in particular also coloured grey or black.

Preforms which essentially consist of materials other than plastic are, for example, metal or ceramic preforms. These may, but do not have to, have been produced by an die-casting process. Metals which come into consideration are, in particular, aluminium, steel, zinc or also copper alloys. Ceramic preforms may have been produced from sinterable ceramic materials. Of these, metal preforms are preferred.

The preform here has on at least one part-area of its outside surface, optionally also on the entire outside surface, bumps and/or pits which together form a three-dimensional pattern. This pattern is preferably macroscopically visible and is, for example, in the form of a pictorial object, an alphanumeric motif, a line and/or dot pattern, a logo, a code or an abstract pattern.

For the purposes of the present invention, it is important that the three-dimensional pattern on the outside surface of the preform does not correspond to the outer shape of the preform, i.e. the bumps and/or pits forming the pattern on the surface of the preform do not form its outer shape, but instead are present in addition to possible bumps and/or pits on the outside surface of the preform which determine the outer shape and are clearly evident as texture of the outside surface. Thus, for example, in the case of a preform which has the outer shape of a hemisphere located on a flat plate, the pattern in accordance with the present invention is not represented by the hemispherical bump on the plate body, although this is likewise a bump on the outside surface, but instead, for example, by a three-dimensionally embossed logo on the hemisphere or the plate body.

In accordance with the invention, the three-dimensional pattern on the outside surface of the preform has bumps and/or pits which can have a height/depth from about 2 µm to a few centimetres and line widths of 50 µm to 2000 µm. The height/depth of the bumps/pits is preferably 10 µm to 50 mm, in particular from 10 µm to 500 µm, and the line widths are preferably in the range from 100 µm to 1000 µm. The area extent of the three-dimensional pattern can range from a few square millimetres to a several hundred square centimetres. These dimensions essentially depend on the size and wall thickness of the preform and on the function that the virtual three-dimensional pattern produced later is intended to carry out in the resultant moulding and can be adjusted correspondingly.

The three-dimensional pattern formed by bumps and/or pits on the outside surface of the preform can be obtained in various ways. If the preform is a polymeric preform made of plastic, the preform can, for example, be produced in an injection-moulding process at the same time as the three-dimensional pattern on its outside surface or the three-dimensional pattern on the surface of a prefabricated polymeric preform can be obtained by laser engraving, to mention just a few examples.

If the preform consists of a material other than plastic, for example of metal, the three-dimensional pattern on its surface can be produced, for example, by casting or die casting at the same time as the production of the preform, but also by stamping or other material-removing cutting processes on the surface of the metal preform.

For the process according to the invention, the way in which the preform including the three-dimensional pattern located on its outside surface is produced is unimportant. In accordance with the present invention, however, the three-dimensional pattern should be a pattern of bumps and/or pits, preferably haptically perceptible, on the surface of the preform which do not determine the outer shape of the preform and are unambiguously recognisable as texture on its outside surface.

If only a part-area of the outside surface of the preform is arranged facing the cavity of the injection mould, it goes without saying in accordance with the present invention that the three-dimensional pattern of bumps and/or pits is located on precisely this part-area of the outside surface of the preform.

After the preform has been fixed to the surface A' of injection mould part A, a transparent thermoplastic film which has been pigmented with flake-form effect pigments is introduced into the internal cavity of the injection mould and optionally fixed there. The transparent thermoplastic film here can be introduced into either injection mould part A or injection mould part B. The film can be fixed temporarily by, for example, application of a vacuum, via spot adhesive points which can easily be detached on exposure to elevated temperature, or other suitable, temporary fixing measures, such as, for example, clamps or frames.

Suitable polymeric plastic materials for the thermoplastic film are the conventional thermoplastic materials, such as, for example, polystyrene (PS), polypropylene (PP), polycarbonate (PC), polymethyl methacrylate (PMMA), styrene-acrylonitrile (SAN), various thermoplastic elastomers (TPEs) or acrylonitrile-butadiene-styrene (ABS), to mention just a few. It is also possible to employ further copolymers which are different from the copolymers mentioned above and which contain the above-mentioned polymers.

The films shaped from the thermoplastic materials are in accordance with the invention pigmented with flake-form effect pigments. The flake-form effect pigments here can be introduced into or applied to the thermoplastic film in various ways. Thus, the flake-form effect pigments can be applied to the entire surface or part of a surface of the thermoplastic film as constituent of a printing ink or coating composition, but they can also be applied, in the case of metal-effect pigments, to the surface of the film with the aid of a vapour deposition process. In each case, coating is preferably carried out over the entire area. The process steps and materials required for the various coating methods are familiar to the person skilled in the art and do not have to be described in greater detail here.

However, the pigmentation of the thermoplastic film is very particularly preferably carried out via mass colouring of the film. This means that flake-form effect pigments in suitable shape and amount are added to the polymeric plastics as early as during production of the film and are converted into films together with the plastics, which is generally carried out by extrusion. This can be carried out by direct addition of flake-form effect pigments to plastic granules or also by the preparation of compounds comprising effect pigments or through masterbatches with subsequent common granulation.

Combined pigmentation of the film with the aid of mass colouring and an additional printing or coating process is also possible.

The pigmented thermoplastic film employed in accordance with the invention comprises the flake-form effect pigments in an amount of 0.1 to 20% by weight, based on the total weight of the pigmented film. Proportions of 0.5 to 5% by weight are particularly preferred here. All pigment proportions here are based on the pigmented film, i.e. on the coated, printed or mass-coloured film. In addition to the flake-form effect pigments, the pigmented thermoplastic film may also comprise further inorganic or organic coloured pigments, dyes and/or fillers. The conventional colorants and fillers generally employed for the colouring of plastic films or printing inks or coating compositions are suitable here so long as they do not permanently hinder the optical effects achieved by the flake-form effect pigments. For certain polymers, for example PET, preference is given to organic dyes, which are soluble in the polymeric plastic material and uniformly colour the resultant films without having an interfering particulate character.

Other polymer films or binders may also be provided with organic or inorganic coloured pigments or fillers in particle form.

The flake-form effect pigments employed in the process in accordance with the present invention can be all known flake-form effect pigments so long as they are visible in or on the thermoplastic film. Flake-form effect pigments of this type are advantageously selected from the group pearlescent pigments, interference pigments, metal-effect pigments, flake-form functional pigments, flake-form structured pigments, or a mixture thereof. These effect pigments are built up from one or more layers of different materials and are in flake form.

These pigments preferably have a flake-form substrate on which one or more layers are located, where at least the substrate and the layer located directly on the substrate and/or at least two layers of the coating which are in each case adjacent differ from one another in their refractive indices n at least by the value Δn=0.1. The layers located on the substrate here are preferably metals, metal oxides, metal oxide hydrates or mixtures thereof, metal mixed oxides, suboxides, oxynitrides, metal fluorides or polymer materials.

Pearlescent pigments consist of transparent flakes of high refractive index and exhibit a characteristic pearlescence due to multiple reflection in the case of parallel orientation. Pearlescent pigments of this type which additionally also exhibit interference colours are known as interference pigments.

Although classical pearlescent pigments, such as $TiO_2$ flakes, basic lead carbonate, BiOCl pigments or nacreous pigments, are naturally also suitable in principle, the effect pigments employed for the purposes of the invention are preferably flake-form interference pigments or metal-effect pigments, which have at least one coating of a metal, metal oxide, metal oxide hydrate or mixtures thereof, a metal mixed oxide, metal suboxide, metal oxynitride, metal fluoride or a polymer on a flake-form substrate.

The metal-effect pigments preferably have at least one metal substrate or a metal coating.

The flake-form substrate preferably consists of natural or synthetic mica, kaolin or another phyllosilicate, glass, calcium aluminium borosilicate, $SiO_2$, $TiO_2$, $Al_2O_3$, $Fe_2O_3$, polymer flakes, graphite flakes or metal flakes, such as, for example, of aluminium, titanium, bronze, silver, copper, gold, steel or diverse metal alloys.

Particular preference is given to flake-form substrates comprising mica, glass, calcium aluminium borosilicate, graphite, $SiO_2$, $Al_2O_3$ or aluminium.

The size of the flake-form substrates is not crucial per se, but the flake-form effect pigments must be visible in or on the thermoplastic film and be capable of being oriented with or in the film. The substrates generally have a thickness of between 0.01 and 5 μm, in particular between 0.05 and 4.5 μm and particularly preferably from 0.1 to 1 μm. The length or width dimension is usually from 5 to 250 μm, preferably from 5 to 100 μm and in particular from 5 to 125 μm. They generally have an aspect ratio (ratio of mean diameter to mean particle thickness) of at least 2:1, preferably of from 3:1 to 500:1 and in particular from 6:1 to 250:1.

The said dimensions for the flake-form substrates also apply in principle to the coated effect pigments used in accordance with the invention, since the additional coatings are generally in the region of only a few hundred nanometres and thus do not significantly influence the thickness or length or width (particle size) or thickness of the pigments.

A coating applied to the support preferably consists of metals, metal oxides, metal mixed oxides, metal suboxides or metal fluorides and in particular of a colourless or coloured metal oxide selected from $TiO_2$, titanium suboxides, titanium oxynitrides, $Fe_2O_3$, $Fe_3O_4$, $SnO_2$, $Sb_2O_3$, $SiO_2$, $Al_2O_3$, $ZrO_2$, $B_2O_3$, $Cr_2O_3$, ZnO, CuO, NiO or mixtures thereof.

Coatings of metals are preferably of aluminium, titanium, chromium, nickel, silver, zinc, molybdenum, tantalum, tungsten, palladium, copper, gold, platinum or alloys comprising these.

The metal fluoride employed is preferably $MgF_2$.

Particular preference is given to effect pigments which have a flake-form substrate comprising mica, glass, calcium aluminium borosilicate, graphite, $SiO_2$, $Al_2O_3$ or aluminium and at least one layer on the substrate, selected from $TiO_2$, titanium suboxides, titanium oxynitrides, $Fe_2O_3$, $Fe_3O_4$, $SnO_2$, $Sb_2O_3$, $SiO_2$, $Al_2O_3$, $MgF_2$, $ZrO_2$, $B_2O_3$, $Cr_2O_3$, ZnO, CuO, NiO or mixtures thereof.

The effect pigments can have a multilayered structure in which a plurality of layers, which preferably consist of the above-mentioned materials and have different refractive indices in such a way that in each case at least two layers of different refractive index are located alternately on the support, where the refractive indices in the individual layers differ by at least 0.1 and preferably by at least 0.3 from one another, are located one above the other on a metallic or non-metallic support. The layers located on the support here may be either colourless or coloured, predominantly transparent, semi-transparent or even opaque.

Depending on the substrate material used and the type of layers applied, the effect pigments obtained are thus also colourless or have a mass tone, or are predominantly transparent, semi-transparent or opaque. Due to the single- or multilayered system on the substrate, however, they are additionally capable of producing more or less intense and glossy interference colours.

Preference is given to the use of the flake-form effect pigments which consist of predominantly transparent materials and have interference effects or also metal pigments, in particular aluminium pigments, which have been coated with interference layers.

However, the flake-form effect pigments employed can also be polymer flakes referred to as holographic pigments or pure metal flakes. In addition, it is also possible to employ flake-form effect pigments whose choice of material in substrate or coating additionally results in magnetic, electrically conductive, fluorescent or other functional properties of the corresponding effect pigments.

The effect pigments described above may be present individually or as a mixture of two or more in the pigmented thermoplastic film employed in accordance with the invention.

Effect pigments which can be employed are, for example, the commercially available functional pigments, interference pigments or pearlescent pigments offered by Merck KGaA under the names Iriodin®, Colorstream®, Xirallic®, Miraval®, Ronastar®, Biflair®, Minatec®, Lustrepak®, Colorcrypt®, Colorcode® and Securalic®, Mearlin® from Mearl, metal-effect pigments from Eckart and optically variable effect pigments, such as, for example, Variochrom® from BASF, Chromafflair® from Flex Products Inc., Helicone® from Wacker, holographic pigments from Spectratec and other commercially available effect pigments.

The geometrical thickness of the pigmented thermoplastic film employed in accordance with the invention can vary in a broad range and is preferably in the range from 20 to 2000 μm, in particular from 50 to 1000 μm. These FIGURES relate both to printed/coated films and also to mass-coloured films.

After the preform and the thermoplastic film pigmented with the flake-form effect pigments have been introduced into the internal cavity of the injection mould, the injection mould is closed and a transparent thermoplastic melt is introduced into the injection mould cavity remaining between the thermoplastic film and the surface B' of injection mould part B. Injection mould part A with the inside surface A' represents the ejector side and injection mould part B with the inside surface B' represents the nozzle side of the injection mould. After the introduction of the plastic melt into the cavity, the latter is completely filled by the plastic melt. The introduction of the transparent plastic melt into the injection mould cavity is preferably carried out under increased pressure and at elevated temperature, in each case depending on the materials used. The temperature of the plastic melt here is at least as high as the glass transition temperature $T_G$ of the plastic component of the thermoplastic film and is preferably above this. Due to the action of the hot plastic melt and the pressure that the molten transparent plastic material exerts on the pigmented thermoplastic film during the introduction into the injection mould cavity, the thermoplastic film reaches a temperature which allows mechanical deformation of the film. The specific working temperature in each case depends on the processed plastics and is usually in the range from 120° C. to 400° C., preferably from 200° C. to 280° C. The pressure employed in the process during the introduction of the thermoplastic melt into the injection mould cavity is also in each case machine- and material-dependent and is usually in the range from 100 to 2500 bar ($1\times10^7$ N/m$^2$ to $2.5\times10^8$ N/m$^2$).

The materials used for the thermoplastic melt are the plastics usually used for injection-moulding processes, such as PS, PC, SAN, ASA, TPO, PMMA, TPE, ABS, ABS/PC mixtures, PA or PP, in each case individually or in compatible combination with one another. They can be employed in colourless or coloured form and after solidification give transparent plastic layers.

During the introduction of the transparent thermoplastic melt into the injection mould, the thermoplastic film warms to such an extent that it becomes mechanically deformable and is able to come into close form-fitting contact with the preform's outside surface, which is facing the internal cavity of the injection mould. Depending on the size and shape of the thermoplastic film, the thermoplastic film bonds in full or part to at least part of the outside surface of the preform, in particular to the part of this outside surface that contains the three-dimensional pattern. At the same time, bonding also takes place to the thermoplastic melt which has been introduced. This is an adherent and positive connection of the thermoplastic film, both with respect to the preform and also with respect to the thermoplastic melt, so that the thermoplastic film is permanently enclosed in the interior of the resultant moulding.

The three-dimensional pattern present on the outside surface of the preform is replicated as negative on the surface of the film that is facing this outside surface of the preform. Since the polymeric thermoplastic material of the film softens, the film is likewise three-dimensionally deformed, at least on its surface facing the outside surface of the preform, at the area units that are in contact with the three-dimensional pattern located there. This thermal deformation of the film can continue over the entire cross section of the thermoplastic film, but may also take place only at its point of contact with the preform, so that the surface of the film facing the thermoplastic melt remains three-dimensionally undeformed, i.e. does not contain the three-dimensional positive of the three-dimensional pattern (which, as already described, is independent of the outer shape of the preform, which the film of course reflects identically, since it adheres to the preform after the thermal treatment). At the same time, the softening of the polymeric film material enables renewed mobility of the flake-form effect pigments present in or on the thermoplastic film. These are usually present in predominantly directed form in or on the thermoplastic, but as yet thermally untreated film, more precisely with their principal axis aligned substantially parallel to the film surface. This alignment can be obtained by the extrusion process preferably employed with consequent mass colouring of the film or also by various coating processes, in which the film is coated or printed with coating compositions containing effect pigments, since the tensile and shear forces exerted with these processes automatically result in parallel alignment of flake-form effect pigments. The mobility of the flake-form effect pigments achieved via the thermal treatment in the injection mould results in reorientation of the longitudinal axes of the effect pigments at the bumps and/or pits which forms the three-dimensional pattern in the surface of the film facing the preform that has been transferred from the surface of the preform. The flake-form effect pigments are moved out of their parallel orientation at the edges of these bumps and/or pits and remain at an acute or steep angle in the thermoplastic polymeric composition of the film in an alignment which is inclined in relation to the film surface. The reflection behaviour of the flake-form effect pigments consequently changes at these points of the film, which leads to generally reduced reflection compared with the flat areas at a steep viewing angle. In this way, the flake-form effect pigments in or on the thermoplastic film replicate the three-dimensional pattern on the outside surface of the preform and optically intensify it through their reflection behaviour adapted thereto.

At the same time, the hot plastic melt flows into the cavity between the thermoplastic film and the inside surface B' and "flows over" the three-dimensional pattern which is visible due to reflection of the flake-form effect pigments and which, viewed from the outside surface of the film that is not bonded to the preform, is identical in appearance to the actual three-dimensional pattern on the outside surface of the preform, but, due to the light reflections emanating from the pigments, can be perceived more clearly and optically more attractively. During subsequent curing of the moulding formed in this way, an adherent, positive bond forms between the thermoplastic film pigmented with flake-form effect pigments and the preform on the one hand and the transparent plastic formed from the transparent thermoplastic melt on the other hand, which is manifested in the subsequent cooling or heating operation. The reorientation of the effect pigments is fixed during the solidification process of the thermoplastic melt. A more clearly visible reorientation of the flake-form effect pigments can be achieved here with mass-coloured, plastic films than with printed or coated films, especially as damage to the surface during the reshaping does not have to be expected here.

The outer layer of transparent plastic which forms the outside surface of the resultant moulding additionally enhances the virtual three-dimensional pattern of flake-form effect pigments obtained in the interior of the moulding through an additional optical depth effect.

When the moulding has cured sufficiently, it can be demoulded or removed from the injection mould.

The resultant moulding has an outer shape which is determined by the shape of the preform the one hand and by the shape of the inside surface B' of the injection mould on the other hand. Viewed from the side of the transparent polymeric plastic (i.e. the outside surface of the moulding), which is generally the "visible side" of the moulding obtained, the moulding in accordance with the present invention exhibits in its interior a virtual, deep-lying, glossy, three-dimensional pattern which is formed from flake-form effect pigments. If the surface B' of injection mould part B is the polished surface usually employed, the resultant polymeric moulding does not have on its outside surface (visible side) a three-dimensional shape which corresponds to the three-dimensional effect pigment pattern visible in the interior of the moulding. Nevertheless, however, the surface B' of the injection mould may likewise have a coarse or fine texture which leads, in the resultant moulding, to a coarse or fine structure on its outside surface, which additionally three-dimensionally enhances or supplements the three-dimensional pattern visible in the interior of the moulding.

The colouring, functionality and gloss behaviour of the virtual three-dimensional pattern corresponds to the colouring, functionality and gloss behaviour of the pigmented thermoplastic film. Colouring, functionality and gloss behaviour of the thermoplastic film are crucially influenced by the flake-form effect pigments present therein, optionally supplemented by additional colourants and/or fillers which are also located in or on the thermoplastic film.

Gloss and colouring of the flake-form effect pigments lead to particularly strong perception of the virtual three-dimensional pattern on the surfaces of the moulding produced. The visible three-dimensional pattern here is significantly more pronounced than the actual deformation of the thermoplastic film would suggest, since movement of the flake-form effect pigments out of the parallel position, even by only a few angle degrees, results in a significant change in their reflection properties. Viewed at the respective specular angle, however, the gloss achieved by the effect pigments is retained over the entire area of the part of the moulding formed by the thermoplastic film.

This relates, in particular, to the moulding's outer surface layer which is formed from the transparent thermoplastic resulting from the thermoplastic melt and, as described above, generally represents the "visible side" of the moulding formed. If the preform is likewise formed from a transparent plastic, the three-dimensional pattern may optionally also be visible on its inside surface. Particularly good visibility of the three-dimensional pattern on the outside surface of the resultant moulding arises if the preform is opaque and/or has preferably been coloured grey or black, in particular if the thermoplastic film has been pigmented with flake-form effect pigments which consist entirely of transparent materials and only have interference colours, but no absorption colour.

If the transparent thermoplastic melt comprises a soluble colorant or small amounts of a particulate colorant, the colouristic impression, perceptible from the side of the outside surface of the resultant moulding, of the virtual three-dimensional pattern can also be modified as desired. Although soluble colorants result in an inherent colour of the thermoplastic melt and the moulding part produced therewith, they have virtually no or absolutely no adverse effect on the transparency of this part of the moulding.

The transparent thermoplastic melt consists (optionally besides conventional fillers and assistants as well as colorants as described) of thermoplastics. These may, as already described above regarding the thermoplastic films, consist of conventional thermoplastics and encompass the same substance groups as described above.

The plastic materials employed in the thermoplastic film and in the thermoplastic melt and in the preform preferably have identical, partially identical or at least similar melting points and melting behaviours in order to make complete material bonding of all polymeric constituents of the moulding easier during the injection-moulding process and in order to facilitate an unbreakable, strong and positive connection. However, for carrying out the process according to the invention, it is sufficient if the temperature of the transparent thermoplastic melt has at least the value of the glass transition temperature $T_G$ of the plastic component of the pigmented thermoplastic film. The starting materials for the thermoplastic film and the transparent thermoplastic melt can be selected in accordance with this prerequisite.

The temperature should, by contrast, remain below the glass transition temperature $T_G$ of the plastic component of a polymeric preform during the injection-moulding process in order to avoid endangering the mechanical stability of the three-dimensional pattern located on its outside surface and to enable precise transfer of the three-dimensional pattern onto the thermoplastic film. It has been found, surprisingly, that this prerequisite is satisfied in the process according to the invention even if the plastics used for the thermoplastic film and for a polymeric preform are identical, since the thermoplastic film acts as protective layer against the preform during the injection-moulding process and the latter does not reach its glass transition temperature during introduction of the thermoplastic melt.

In the case where it is necessary to employ plastic materials which have very different melting points and melting behaviours or do not satisfy the above conditions regarding glass transition temperature and melting point for the thermoplastic film pigmented with flake-form effect pigments and the thermoplastic melt, an adhesion-promoting layer applied to the thermoplastic film surface projecting into the injection mould cavity may be helpful in the thermal bonding of film and melt. This also applies to thermal non-compatibility of the binder systems of a pigmented printed layer or coating on the thermoplastic film, since the printed layer or coating, if present, are preferably located on the thermoplastic film surface projecting into the injection mould cavity. The adhesion-promoting layer ensures an unbreakable bond of film and plastic melt and can be selected by the person skilled in the art on the basis of his expert knowledge.

In a similar manner, an adhesion-promoting layer may also be provided between the thermoplastic film pigmented with effect pigments and the preform.

The present invention also relates to a moulding which consists at least of a preform, an interlayer, located on the preform, of a thermoplastic which has been pigmented with flake-form effect pigments, and an outer surface layer of a transparent thermoplastic, where the outer surface layer exhibits on at least one part-area thereof an optically perceptible, virtual three-dimensional pattern which is formed in the interior of the moulding by the flake-form effect pigments, and where the outer surface layer of the moulding itself does not have a corresponding spatial three-dimensional pattern. Such mouldings can be produced by the above-described injection-moulding process according to the invention.

The moulding in accordance with the present invention is a polymeric moulding or a composite moulding.

Whereas in the case of a polymeric moulding the preform likewise consists substantially of a polymeric material, i.e. of a plastic, in the case of a composite moulding the preform is composed predominantly of a material other than plastic and preferably consists of a metal.

The thermoplastic film which has been pigmented with flake-form effect pigments that is used in the production of the moulding according to invention forms in the resultant moulding the above-mentioned interlayer of a thermoplastic which has been pigmented with flake-form effect pigments. The outer surface layer of the moulding according to the invention comprising transparent thermoplastic is formed from the transparent thermoplastic melt on solidification.

The material compositions of preform, thermoplastic film, flake-form effect pigments and transparent thermoplastic have already been described in detail above. Reference is expressly made here to this description with respect to the moulding according to the invention.

If the plastic used in the thermoplastic film or the binder systems used in a printed layer or coating are not sufficiently thermally compatible with the melting behaviour of the transparent thermoplastic that forms the outside surface layer of the moulding according to the invention in order to be able to be strongly bonded to one another in a positive manner by means of a single process step, the moulding according to the invention advantageously also has an adhesion-promoting layer between the pigmented thermoplastic film and the cured thermoplastic. This layer consists of one or more polymeric plastics and forms an unbreakable, strongly adherent bond between the thermoplastic film and the transparent thermoplastic. The choice of suitable material can be made by the person skilled in the art on the basis of his expert knowledge in accordance with the respective requirement.

If necessary for the above-mentioned reasons, an adhesion-promoting layer may also be provided between the film pigmented with the flake-form effect pigments and the preform. This may play a role, in particular, on use of metallic preforms.

The virtual three-dimensional pattern visible on the outside surface (visible side) of the moulding according to invention is the positive copy of the bumps and/or pits which are located on the surface of the preform. However, this copy is produced principally by the different orientation of flake-form effect pigments in or on the thermoplastic interlayer located in the interior of the moulding according to the invention, whereas the three-dimensional pattern actually located on the surface of the preform in the resultant moulding is only weakly visible or is invisible.

As already described above, the size of the vertical and horizontal extent of the visible three-dimensional pattern on the outside surface of the moulding according to the invention can vary in broad ranges, which is selected depending on the size of the preform and the thickness of the thermoplastic film and the intended purpose of the three-dimensional pattern on the moulding (example: code versus decorative effect). The thickness of the thermoplastic film generally represents the upper limit for the height or depth of the bumps and/or pits on the surface of the preform, but in individual cases these may also exceed the thickness of the thermoplastic film.

The three-dimensional pattern on the outside surface of the preform has bumps and/or pits from a height/depth of about 2 μm to a few centimetres and line widths of 100 μm to 2000 μm. The area of the three-dimensional pattern can range from a few square millimetres to a several hundred square centimetres and is, like the height/depth and width of the pits or bumps, measured in accordance with the above-mentioned criteria.

The surface of the preform that contains the three-dimensional pattern is located here in the interior of the moulding and cannot be separated therefrom.

Flake-form effect pigments are likewise arranged in the interior of the moulding in a thermoplastic interlayer between the preform and the outside surface of the moulding. This interlayer also cannot be separated from the other constituents of the moulding.

The flake-form effect pigments arranged in the interlayer in each case have a longitudinal axis which corresponds to the longest dimension of the pigments and have different orientations of these longitudinal axes in the interlayer, relative to a base area of the interlayer, as has already been described above. This different orientation of the flake-form effect pigments leads to different light reflection of the effect pigments in the case of incident light and leads to a virtual, glossy pattern with a three-dimensional appearance in the interior of the moulding according to the invention which is visible on its outside surface, but is not haptically perceptible.

Instead, the outer surface layer of the moulding consists of a transparent thermoplastic and preferably has, apart from the outer shape, no additional surface structure. In individual cases, however, such an additional texture/structure of the outside surface may be appropriate or sensible.

In contrast to the outer surface layer of the moulding, the preform can be transparent, translucent or opaque. It is particularly advantageous if the preform is colourless or coloured, but opaque, in particular if it is coloured grey or black and is preferably additionally opaque. This enables an increase in the contrast and visibility of the virtual, three-dimensional pattern formed in the interior of the polymeric moulding by the flake-form effect pigments.

The virtual three-dimensional pattern visible on the outside surface of the moulding is as such not haptically perceptible on this surface and is therefore protected against mechanical influences. At the same time, it is readily perceptible and optically attractive due to the different light reflection of the flake-form effect pigments. The transparent plastic layer forming the surface of the moulding increases the impression of depth and thus the optically perceptible three-dimensionality of the pattern.

The present invention also relates to the use of the polymeric moulding described above as decorative and/or labelling element or part of durable consumer goods.

Durable consumer goods here are essentially and preferably packaging, products in the electrical and electronics industry, domestic appliances, furniture, clothing, bags, shoes, sports articles or vehicles. In principle, however, the mouldings according to the invention can be employed in all areas in which it is advantageous to employ mouldings that can be produced in an injection-moulding process and have a readily visible, attractive three-dimensional pattern which at the same time cannot be felt on the surface. In articles of this type, the virtual three-dimensional pattern can be employed for purely creative, decorative reasons, but also for the purpose of product labelling with batch numbers, manufacturer's data and the like.

The present invention provides a simple and inexpensive injection-moulding process with the aid of which it is possible to produce mouldings which exhibit on at least one of their surfaces a glossy, optically attractive, virtual three-dimensional pattern which exhibits an appearance which is can be varied in colour, gloss and functionality and may contain fine lines with high precision. These can be polymeric mouldings which are substantially composed of plastics, but also composite mouldings which have a core of a material other than plastics. For many areas of application of injection mouldings which require special materials, a process is thus created for improving their optical appearance which was hitherto not available. Furthermore, the process according to the invention has the advantage that, even in the case of polymeric mouldings, achievement of impressive three-dimensional patterns which are based on the spatial alignment of flake-form effect pigments does not require pigmentation of the entire polymeric moulding with these flake-form effect pigments, but instead only part of the moulding, which, as required, may also be relatively small (example only 10% by weight), based on the total weight of the polymeric moulding. The process according to the invention can be carried out using conventional injection-moulding machines and is therefore inexpensive and can be adapted in line with needs. With the aid of the process according to the invention, complex mouldings which are free from flow lines and are coloured and patterned impressively with effect pigments can be produced in a simple, inexpensive manner. The resultant mouldings according to the invention are durable and generally have an unembossed surface of high visual attractiveness and a virtually indestructible three-dimensional virtual pattern having high line sharpness. They are of uniform colour and of high gloss and can be employed in a variable manner in many industrial and decorative areas of application.

The invention will be explained in greater detail below with reference to examples, but is not intended to be restricted thereto.

EXAMPLE 1

In a prior process step, a plastic plate is injection-moulded from ABS (Terluran® GP-22, product from BASF SE) having a carbon-black content of 0.2% by weight, based on the weight of the plastic, in a size of 100×150 mm and a thickness of 10 mm. One of the principal surfaces of the plastic plate is provided with a logo in a size of about 30×45 mm by laser ablation with the aid of a laser device (Trumpf, Vectormark compact). The logo has various pits, each with a depth of about 100-150 µm.

A film produced by means of an injection-moulding process (SAN Luran® 358N, product from BASF SE) having a content of 1.5% by weight of Colorstream® T10-09 Pacific Twinkle (flake-form effect pigment based on $SiO_2$ substrates, particle size 20-200 µm, product from Merck KGaA) and 0.2% by weight of PV Fast Blue B2G01 (product from Clariant International Ltd.) having a thickness of about 800 µm is produced in a size of 100×150 mm.

An injection-moulding machine of the Kraus-Maffei CX-130-380 type is used. The prefabricated plastic plate is laid in a mould insert measuring 100×150 mm in the inside surface of the injection mould in such a way that the surface of the plastic plate that carries the logo faces the cavity of the injection mould. The film mass-coloured with effect pigments, which has likewise been produced in advance, is subsequently fixed in the internal cavity of the injection mould, and the mould is closed.

After closing of the mould, a transparent plastic melt (SAN Luran® 358 N, product from BASF SE) is injected into the cavity remaining in the injection mould between the pigmented thermoplastic film and the surface of the injection mould that is not provided with the preform (nozzle side). The injection operation is carried out at a temperature in the range from 220 to 260° C. and a pressure in the range from 450 to 900 bar ($4.5 \times 10^7$ $N/m^2$ to $9 \times 10^7$ $N/m^2$).

After the cooling operation and the opening of the injection mould, a plastic plate is obtained whose first outside surface exhibits an area with uniformly strong blue gloss which changes colour between blue and green and gives the impression of lying behind glass, having a glossy, virtual three-dimensional pattern located therein in the form of a logo which is formed by the flake-form effect pigments in the film and which corresponds to the motif of the logo on the surface of the prefabricated plastic plate containing carbon black. The other principal surface of the plastic plate obtained is flat, opaque and has a black colour.

EXAMPLE 2

A PP preform in the outer shape of a closure cap having an outside diameter of 47 mm, a height of 11.5 mm and a wall thickness of 0.6 mm (Metocene® HM 648T, product from LyondellBasell, NL) having a carbon black content of 0.2%, based on the weight of the plastic, is injection-moulded in a prior process step. The closure cap has a three-dimensional zigzag structure with a diameter of about 30 mm on its outside surface (lid).

A pigmented film having a thickness of 400 µm (Metocene® HM 648T, product from LyondellBasell, NL) which has a content of 2% by weight of a flake-form effect pigment (Iriodin® 4504, particle size 5-50 µm, product from Merck KGaA) is produced by means of an extrusion process. The film is cut to give a circle having a diameter of 44 mm.

An injection-moulding machine of the Arburg Allrounder 320 M type is used. The preform is laid in a mould insert (outside diameter 48.2 mm) in the inside surface of the injection mould in such a way that the surface of the preform carrying the contour faces the cavity of the injection mould. The film mass-coloured with effect pigments, which has likewise been produced in advance, is subsequently fixed in the internal cavity of the mould, and the mould is closed.

After closing of the mould, a transparent plastic melt (PP, Borealis PP RJ901MO) is injected into the injection mould cavity remaining between the pigmented thermoplastic film and the surface of the injection mould that has not been provided with the preform (nozzle side). The injection operation is carried out at a temperature in the range from 180 to 260° C. and a pressure in the range from 300 to 900 bar.

After the cooling operation and the opening of the injection mould, a closure cap is obtained whose outside surface exhibits, in the region of the lid, an area with uniform gloss which changes in colour and gives the impression of lying behind glass, having a glossy, virtual three-dimensional pattern located therein in the form of a zigzag structure which is formed by the flake-form effect pigments in the film and which corresponds in shape to the motif of the pattern on the surface of the prefabricated preform, but which gives a significantly more three-dimensional impression in optical depth and thus the spatial impression imparted than the actual three-dimensional pattern on the surface of the preform. The inside surface of the closure cap obtained is flat, opaque and has a black colour.

The invention claimed is:

1. Injection-moulding process for the production of virtual three-dimensional patterns in mouldings, comprising:
   providing an injection mould which has injection mould parts A and B which can be separated from one another and which in each case have an inside surface A' and B' and together form an internal cavity, and where, with the injection mould opened,
   a preform which has a two- or three-dimensional shape and an outside surface which is fixed to the inside surface A' of injection mould part A in such a way as to occupy part of the cavity where the outside surface of the preform not fixed to the inside surface A' of injection mould part A faces the part of the cavity not occupied by the preform when the mould is opened, where this outside surface facing the cavity has, at least on a part-area thereof, bumps and/or pits which together form a three-dimensional pattern,
   introducing a thermoplastic film which has been mass-coloured with flake-form effect pigments into the internal cavity,
   closing the injection mould,
   introducing a transparent thermoplastic melt into the internal cavity between the thermoplastic film and the surface B' of injection mould part B, where the thermoplastic film is three-dimensionally deformed and forms a strongly adherent and positive connection to at least that part-area of the outside surface of the preform that contains the three-dimensional pattern and at the same time to the thermoplastic melt, where the flake-form effect pigments reorient with their longitudinal axes at the bumps and/or pits and replicate and optically intensify the three-dimensional pattern located on the outside surface of the preform on or in the thermoplastic film, heating or cooling the injection mould and, subsequently, demoulding or removing the resultant moulding, which has an outside surface of a transparent thermoplastic and exhibits on at least part of this outside surface a virtual three-dimensional pattern formed by the flake-form effect pigments.

2. Process according to claim 1, wherein the thermoplastic melt, when injected, has at least a temperature which is at or above the glass transition temperature $T_G$ of the thermoplastic film.

3. Process according to claim 1, wherein the three-dimensional pattern is a macroscopic pattern in the form of a pictorial object, an alphanumeric motif, a line and/or dot pattern, a logo or a code.

4. Process according to claim 1, wherein the flake-form effect pigments are selected from the group consisting of pearlescent pigments, interference pigments, metal-effect pigments, flake-form functional pigments, flake-form structured pigments, or a mixture thereof.

5. Process according to claim 1, wherein the flake-form effect pigments have a particle size in the range from 5 to 250 µm and an aspect ratio of at least 2.

6. Process according to claim 1, wherein the flake-form effect pigments consist of a flake-form substrate and one or more layers on the substrate, where the substrate and the layer located directly on the substrate and/or at least two layers which are in each case adjacent differ from one another in their refractive indices n at least by $\Delta n=0.1$.

7. Process according to claim 1, wherein the flake-form effect pigments are present in the pigmented thermoplastic film in an amount of 0.1 to 20% by weight, based on the total weight of the pigmented film.

8. Process according to claim 1, wherein the pigmented thermoplastic film, in addition to the flake-form effect pigments, also comprises further organic or inorganic coloured pigments, dyes and/or fillers.

* * * * *